May 12, 1936.　　　　S. V. HOLMES　　　　2,040,554
AUTOMATIC TIRE PRESSURE OPERATED SWITCH
Filed May 11, 1932
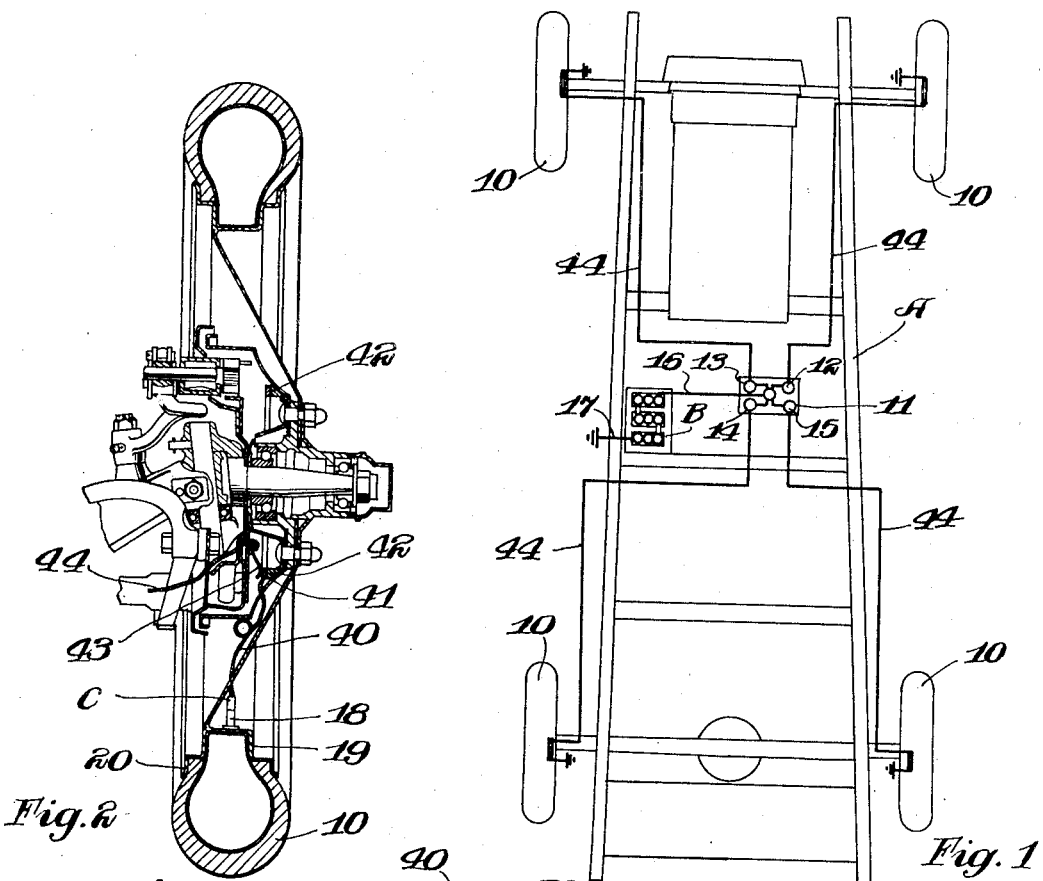
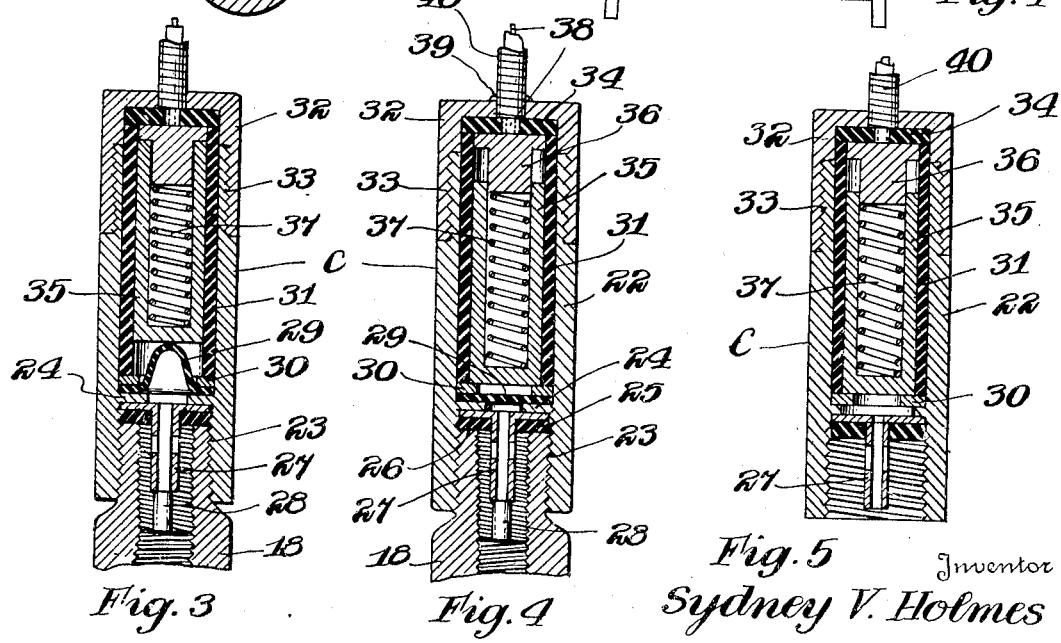
Fig. 3　　Fig. 4　　Fig. 5
Inventor
Sydney V. Holmes
By Howard Fischer
Attorney Patented May 12, 1936

2,040,554

UNITED STATES PATENT OFFICE 2,040,554

AUTOMATIC TIRE PRESSURE OPERATED SWITCH

Sydney V. Holmes, St. Paul, Minn., assignor of one-half to Edward J. Radlein, St. Paul, Minn.

Application May 11, 1932, Serial No. 610,621

4 Claims. (Cl. 200—58)

My invention relates to an automatic tire safety signal consisting of a valve member which attaches to the tire valve stem in place of the valve cap, thus providing a simple, virtually inconspicuous and neat attachment with the valve stem of the tire.

A feature resides in a signal valve attachable to the valve stem of the tire of a vehicle and having means for closing an electric circuit to provide an automatic tire safety signal. The signal proper may be of any suitable construction and located in a convenient place in the automobile or vehicle. It may be desirable to use small electric lights on an instrument board on which one light is positioned for each tire of the vehicle. When the pressure in the tire recedes to a dangerous point, the signal valve operates to cause the indicator on the instrument board to light the light, showing a signal light for the respective tire with the low pressure.

The signal valve is attached to the valve stem of the tire to firmly hold the same thereto and extending from this valve, I provide an electric conductor which is connected by suitable brush and contact means through the hub of the wheel and which in turn is connected by an electrical conductor extending to the instrument board. A suitable conductor extends to the instrument board from a source of energy like the battery and one wire may be employed for the circuit, while the other side of the circuit is grounded to the frame and wheel of the car.

It is a feature to provide a signal valve of an extremely simple construction which may be provided with operating parts confined within a comparatively small space so as to maintain the signal valve as small as possible and having means for fixing it to the regular valve stem of the tire. The valve includes a sealing washer which hermetically seals against the regular valve stem to form an air tight joint. This sealing means includes a rigid shoulder formed in the signal valve. An expandible disk above the shoulder which has its edges locked in the signal valve is adapted to expand and raise a plunger within the valve which holds the electric circuit in the valve open while the pressure in the tire is normal and until the pressure in the tire drops to a dangerous point. When this takes place, a plunger spring urged moves into position to close the electric circuit in the valve and operates a signal corresponding to the respective tire in which the pressure has lowered. This permits the operator of the vehicle to be warned immediately of the low pressure in a particular tire and prevents running of the vehicle on a low pressure tire so as to prevent ruining of the tire if possible.

It is also a feature to provide a signal valve of an extremely simple inexpensive structure and having only a few parts, none of which may easily get out of order in ordinary use and wherein the expandible disk, the only part on which there may be any real strain and wear, may be readily replaced. The valve is completely sealed when attached so as to act as a valve cap in addition to its function as a signalling switch. Should the circuit outside of the valve become broken for any reason, the valve itself would still act as a cap.

These features, together with other details and objects will be more fully and clearly described in the following specification and claims.

Figure 1 is a diagrammatic plan view of a vehicle chassis showing my automatic tire safety signal attached thereto.

Figure 2 is a cross section through a wheel, showing my tire safety signal attached to the same and showing the connection through the wheel hub.

Figure 3 illustrates a cross section through my signal valve attached to a valve stem, only a portion of which is shown, and showing the parts of my valve in normal operating position when pressure in the tire of the respective valve stem is normal.

Figure 4 illustrates a section similar to Figure 3 when the pressure in the tire of the respective valve stem has gone down to a dangerous point, showing the circuit closed in my signal valve by the operating plunger.

Figure 5 is a similar cross section to Figure 3, showing a different form.

The drawing illustrates a vehicle chassis A, which is of any suitable design where the same is supported by a series of pneumatic tires 10. It is well known that pneumatic tires such as 10, should be kept at a comparatively uniform pressure and when the pressure goes below a certain point, it is dangerous to drive the vehicle, as well as injurious to the tire itself. Therefore, it is very desirable to provide a means of indicating to the operator of the vehicle A when any of the tires 10 drop below good operating pressure.

I provide an instrument board 11 on which a series of signal lights 12, 13, 14 and 15 are provided to provide indicating means for each of the respective tires 10. This instrument board 11 may be placed upon the dash or instrument board of the automobile or in any other convenient position. By means of the electrical conductor 16, I connect the instrument board with an electric battery B and in the ordinary manner, this battery is grounded by the conductor 17 to the frame and chassis or vehicle A. The conductor 16 connects with a common battery conductor in the instrument board 11 extending to each of the signal lights.

The tires 10 are provided with regular valve stems 18 which project through the rim 19 of the wheel 20 and I provide a signal valve C, having a tubular casing 22 which is adapted to be threaded at 23 to the valve stem 18 to securely attach the same thereto. Within the casing 22 of the valve C, I provide an integral or fixed shoulder 24 having a packing washer 25 made of rubber or other suitable material which is adapted to engage against the upper edge 26 of the valve stem 18 when the valve C is attached to the stem so as to provide an air tight seal between the valve 18 and the inner chamber of the valve 22. Projecting through the washer 25, I provide a tubular valve releasing member 27 which projects into the valve stem 18 in a manner to engage the valve plunger 28 therein and hold the same in open position so that the air may pass through the valve stem 18 and through the tubular member 27 into the inner chamber of the valve C.

Within the chamber of the valve C, I marginally clamp a flexible disk 29 to the shoulder 24 by means of the metal washer 30 which contacts with the casing 22 of the valve C and which is held in clamping position to clamp the washer 29 by the electrical insulating sleeve 31. The sleeve 31 is held in clamping position by the cap 32 which is screwed on at 33 to the body or casing 22 of the valve C. An insulating washer 34 which may be integral with the insulating sleeve 31 or a separate washer which bears against the sleeve 31 to hold it in clamping position, acts as an insulating thimble and insulates the working parts, which will be presently described, to close an electric circuit in the valve C.

Within the insulating thimble formed by the sleeve 31 and the insulating washer 34, I provide a spring urged metallic hollow plunger 35. Associated with this plunger and held adjacent the washer 34 is the metallic plug 36 having one end adapted to freely slide within the hollow open end of the plunger 35. Between the plug 36 and the inner end of the plunger 35, I provide a coil spring 37 which tends to force the plunger 35 toward the flexible washer 29. The metallic plug 36 is connected by the electrical conductor 38 which is insulated from the casing 22 and the cap 32 and extends through a hermetically sealed joint 39 in the top of the cap 32 in the form of an armored cable 40. The armored cable 40 carrying the conductor 38 is adapted to extend from the rim 19 of the wheel 20 to the revolving portion 41 of the hub of the wheel. The conductor 38 extending through the cable 40 is connected to the ring conductor 42 inside of the hub or brake drum of the wheel 20.

Mounted upon the stationary portion of the hub of the wheel 20, and within the brake drum thereof as illustrated in Figure 2, I provide a contact brush or brushes 43 which contact with the ring 42 and serve to carry the electric current from the conductor 38 through the wheel 20 and on to the conducting cable or wire 44 which extends from each wheel to the instrument board 11 and is connected with one of the respective lights 12, 13, 14 or 15.

The valve C is of an extremely simple design having a small number of working parts namely, the flexible washer 29 and the plunger 35 urged by the spring 37. When the valve C is in place on the regular valve stem 18, the valve stem is closed by the valve C as a cap and no air can leak through the valve C to escape to the outer atmosphere. Even though the flexible washer 29 is broken or wears out, the air pressure from the valve stem 18 will not escape out of the valve C. I have shown a structure like illustrated in Figure 5 of the valve C, wherein no flexible washer 29 is required. In other respects, the valve C may be identical and the cable 40 with the conductor 38 are extended through the cap 32 to make an air tight seal therein. It is also obvious that the insulating sleeve 31 when formed with the end 34 on the same, would assist in acting as an air seal within the valve C.

The operation of my automatic tire safety signal is simple and effective. When the pressure in the tire 10 drops below the proper operating pressure, the pressure in the inner chamber of the valve C drops so that the plunger 35 will be pressed by the spring 37 down into contact with the metallic washer 30 on the shoulder 24, as illustrated in Figure 5. This will close a circuit through the ground connection, through the rim 19 of the wheel, through the wheel proper and through the chassis of the car, while the conductor 38 will light one of the signal lights on the instrument board 11 when this circuit is closed by connection with the battery B. Thus, the operator of the vehicle would be instantly advised of the falling of pressure in one of the tires and the particular tire will be designated by the respective signal lights on the instrument board 11. There are no intricate parts to get out of order, the valve C operates virtually instantly with the falling of pressure in a tire and is positive in making a contact, being virtually hermetically sealed. The parts are replaceable and removable so that the signal valve C is in a sense indestructible. The same may be made small and neat so as not to be unsightly on the wheels of a car and providing a means projecting in a sense like the valve stem itself from the rim of the wheel.

In accordance with the patent statutes, I have described and set forth the principles of my invention, and while I have illustrated the same in a particular form and described its operation accordingly, the invention should be interpreted within the scope of the following claims and for the purposes therein designated.

I claim:

1. A pressure operated switch including, a casing, an insulating sleeve within said casing, a plunger within said sleeve, a ring-like washer contact at one end of said sleeve, means for urging said plunger toward said contact, an air tight expansible pressure operated member in said casing expansible through said washer to hold said plunger normally spaced from said contact, said plunger closing said switch when pressure against said flexible member drops below normal and an electric conductor leading from said plunger.

2. A pressure operated switch including, a metallic casing, an insulating thimble entirely within said casing, a metallic plug positioned in one end of said thimble, an electrical connection extending from said plug out of said casing and insulated therefrom, a spring urged metallic hollow plunger slidably positioned within said thimble and slidably contacting with said plug, metallic washer means electrically grounded with said casing at the open end of said thimble, and an expandible air-tight disc adapted to expand under a predetermined air pressure through said grounding washer to hold said plunger out of contact with said washer holding said switch open under a predetermined air pressure.

3. An air operated switch adapted to act as a cap on a valve stem of a tire including, a casing having a diameter virtually equal to the diameter of the valve stem, an insulating sleeve-like thimble entirely within said casing, a metallic plug having an insulated electrical connection positioned in one end of said thimble, a hollow spring urged slidable plunger contacting with said plug and positioned in said insulating thimble, a ground connection with said casing positioned at one end of said thimble sleeve, and a disc-like expandible airtight member adapted to be expanded by a predetermined air pressure to hold said plunger from contacting with said ground to said casing under normal air pressure.

4. A pressure operated switch including a metallic casing, an insulation thimble in said casing, a contact in the closed end of said thimble having an insulated electric contact thereto, a plunger in said thimble electrically connected to said contact, a ring in said casing adjacent the open end of said thimble electrically connected to said casing, an expansible member adjacent said ring expansible through said ring to hold said plunger spaced from said ring under predetermined pressure against said expansible member, and means urging said plunger against said ring in the absence of the aforementioned predetermined pressure.

SYDNEY V. HOLMES.